United States Patent [19]

Brotzmann et al.

[11] 4,196,159
[45] Apr. 1, 1980

[54] PROCESS FOR INCREASING THE LIFE OF THE REFRACTORY MASONRY OF METALLURGICAL VESSELS

[75] Inventors: Karl Brotzmann, Sulzbach-Rosenberg; Paul G. Mantey, Amberg, both of Fed. Rep. of Germany

[73] Assignee: Eisenwerk-Gesellschaft Maximilianshutte mbH., Sulzbach-Rosenberg, Fed. Rep. of Germany

[21] Appl. No.: 877,920

[22] Filed: Feb. 15, 1978

Related U.S. Application Data

[63] Continuation of Ser. No. 448,608, Mar. 6, 1974, abandoned.

[30] Foreign Application Priority Data

Mar. 7, 1973 [DE] Fed. Rep. of Germany ....... 2311306

[51] Int. Cl.² .............................................. F27D 1/16
[52] U.S. Cl. .................................. 264/29.1; 264/30; 266/281
[58] Field of Search .......................... 264/29.1, 30, 81; 266/282

[56] References Cited

U.S. PATENT DOCUMENTS

| | | | |
|---|---|---|---|
| 1,010,312 | 11/1911 | Planche | 264/30 |
| 2,247,376 | 7/1941 | Heuer | 264/30 |
| 2,791,116 | 5/1957 | Heuer | 266/282 X |
| 2,883,708 | 4/1959 | Sem | 264/81 X |
| 3,250,832 | 5/1966 | Metz | 264/29.1 X |
| 3,358,986 | 12/1967 | Anderson | 266/282 |
| 3,416,780 | 12/1968 | Hanna | 266/282 |
| 3,706,549 | 12/1972 | Knuppel et al. | 266/222 X |

OTHER PUBLICATIONS

"Destruction of Refractories by the Effect of Methane Containing Gases," Stahl und Eisen, 1973, pp. 956–963.

*Primary Examiner*—Thomas P. Pavelko
*Attorney, Agent, or Firm*—Lawrence I. Field

[57] ABSTRACT

A process for increasing the life of refractory masonry of furnaces and metallurgical vessels in which the masonry is exposed to oxidizing atmospheres at high temperatures and/or molten metals or slags which are highly erosive, which process consists in depositing carbon in the pores of such masonry by means of carbon carrying media which are decomposed when heated.

15 Claims, 5 Drawing Figures

PROCESS FOR INCREASING THE LIFE OF THE REFRACTORY MASONRY OF METALLURGICAL VESSELS

This is a continuation of application Ser. No. 448,608, filed Mar. 6, 1974, now abandoned.

The invention relates to a process for increasing the life of the refractory masonry of furnaces and metallurgical vessels by embedding carbon in the pores of such masonry.

It is known that the life of refractory substances and bricks may be prolonged by means of carbon. One way in which this is achieved is by preparing a mixture of a refractory material, for instance sintered dolomite or magnesite and tar, and then shaping it and then baking it under reducing conditions at about 500° C. in order to crack the tar. Carbon is formed during cracking, which will partly fill the matrix consisting of the refractory material. Another way of using carbon is to make bricks in the conventional manner from refractory material and then to steep them in tar-pitch baths. The steeped bricks are then used for building a refractory masonry structure and the structure is then baked so as to crack the tar.

The carbon obtained from cracking the tar in these procedures fills no more than 20% of the pores of the refractory material, and no more than a carbon content of 2-4% may be achieved by means of the known processes, even though the porosity of the refractory material is usually between 15 and 20%. The action of the carbon which is embedded in the refractory material in inhibiting the infiltration of metal and slag is not completely understood. However, it is observed that the carbon in the refractory material will be used up in service. Inspection of converters has shown that the carbon containing masonry of a converter will be practically free from carbon after it has been used for some time and that the masonry has become infiltrated in part by slag and metal in the surface region. However, the carbon content is found to increase outwardly from this zone, that is, toward the converter casing, in gradual manner.

The carbon removal from the refractory material appears to be determined by the effect of the oxidizing slag and furnace atmosphere and metal and/or slag penetrate the pores in the masonry and rapidly destroy the carbon-free masonry at those locations. Continuous decarburization appears to be related to increasing penetration by metal and/or slag and hence increasing erosion of the refractory masonry.

Numerous proposals already have been advanced to prevent the decarburization in the working-surface region of the masonry. Thus German Offenlegungsschrift No. 2,210,731 describes a process wherein carbon is deposited on the masonry in the form of a fluid or daubable substance such as tars or hydrocarbons. The known process suffers from several drawbacks: first it is extremely difficult to apply the carbon layer evenly over the entire surface of the masonry, which ordinarily will be at temperatures exceeding 1,000° C. and frequently even above 1,500° C.; special difficulties arise because tars and hydrocarbons will dissociate at temperatures above 500° C. Hence attempts to apply the pasty substance to the particular hot vessel will be accompanied by marked generation of gases or smoke and reactions will take place in the refractory substance such as are encountered when burning conventional tar-dolomite or magnesite substances. The fluidity of the tar or hydrocarbon substance therefore will soon be lost and it no longer will be feasible to apply it to the furnace wall and to bond it in intimate contact with the rough and fissured hot masonry surface.

A further disadvantage of known processes arises from the requirement of depositing the substance containing carbon on a masonry surface which is covered at least in part with residues of metal and slag which residues effectively seal the pores of the masonry which has been penetrated by the metal and/or slag. Therefore in the known process a more or less adequate protective layer is deposited without being able to recarburize the decarburized zones in the near-surface regions, and without being able to embed carbon in the pores, fissures or other cavities that are formed in the masonry during operation.

The present invention is directed to providing a process for embedding carbon into the pores and cavities of refractory masonry, especially in the region of the near-surface decarburized zone, not only during idle periods, but also during operation. The shortcomings of the prior art are overcome by infiltrating a fluid carbon carrier in situ from the outside intact masonry side into the masonry toward the faces exposed to attack. The invention makes use of the porosity in the intact parts of the masonry and of the presence of joints and cavities therein, in order to carry the carbon into the zone of maximum decarburization or maximum wear and to fill the pore volume in the masonry.

A special advantage of the process of the invention consists in the fluid carbon carrier being made to infiltrate the masonry from the cold side and therefore diminishing the danger of undesired reactions and conversions taking place during the application process. The infiltration of carbon-dissociating gases and liquids is effected while there is no danger of cracking on the outside of the refractory material. Instead, the hydrocarbons penetrate the pores, cracks and masonry joints and reach the inside surface of the masonry, where they may partly burn. The hydrocarbons at least in part will be cracked on their way through the masonry because of the temperature gradients prevailing there and will continuously deposit carbon. The carbon deposition is greater, the larger the rate of the carbon carrier passing through. The flow rate in each particular case is a function of flow resistance, so that the carbon carrier will mainly flow in the direction of largest flow cross-section and hence of least flow resistance. Therefore, those zones of higher porosity and larger cavities, cracks and joints will be more amply provided with carbon carrier and therefore will also be more quickly enriched in carbon. Thus, carbon embedding tends to take place preferentially where masonry wear is largest and where the masonry is most exposed to attack. Infiltration is also accompanied by a side-effect, namely some cooling of the masonry occurs due to the lower temperature of the carbon carrier and endothermal dissociation of the carbon carrier. Furthermore the pressure drop from outside to inside while infiltration is proceeding opposes continuing masonry wear, especially that due to penetration in the opposite direction by metal and/or slag.

Trials have shown that a masonry of magnesite bricks can be enriched to saturation with carbon after a relatively short infiltration time. Enrichment is faster for rammed or vibrationtamped masonry because of its larger pore volume.

Preferably the carbon carrier is caused to infiltrate in a direction opposite to that of masonry wear, that is, essentially normally to the masonry surface. This may be achieved by directing the carbon carrier through the wall of the vessel or furnace in a special way, preferably by first distributing it through a porous intermediate layer from which it is caused to infiltrate, and penetrate into the masonry to be carburized, from said layer. Ordinarily a few entry locations per square meter of masonry surface will suffice. However, the number of entry positions will depend on the kind of masonry and on the shape of the vessel or furnace. In the case of a converter, one entry position per 1-5 square meters of furnace wall surface was found suitable. Obviously more entry positions may be used in areas subject to greatest wear, for instance in the converter bottom.

The carbon carrier is supplied to the entry positions by means of pipes which may be insulated so as to keep the temperature below the dissociation temperature of the carbon carrier, for instance less than 400°-450° C. The entry position may be located directly in the masonry or else also in a porous intermediate layer. For this purpose, metallurgical furnaces, pig iron mixers, ladles, pony ladles in continuous casting and vacuum vessels are provided with an insulating layer of relatively high porosity between the masonry and the outer casing. This intermediate layer is to insure a uniform distribution of the carbon carrier over the entire masonry or over individual masonry areas. In apparatus in which such insulating layers are not conventionally present, for instance in converters, electric and Martin-Siemens furnaces, cupolas and blast furnaces, such an intermediate layer can be provided during reconstruction e.g. when a new casing is being installed, the intermediate layer appreciably improving the distribution of the fluid carbon carrier and hence contributing substantially to masonry life improvement. The intermediate or distributing layer need only be 10-50 mm. thick and may consist of a fill of coarse-grained, refractory material.

In order to accomodate the invention to installations with varying masonry wear, and where a varying infiltration and varying carburization is desired, the fluid carbon carrier may be made to infiltrate in one or several masonry areas bounded by gas-tight or liquid-tight barrier-layers. A barrier-layer may be considered as gas or liquid-tight in the sense of the invention if its porosity is appreciably lower than that of the masonry. Thus, regions of masonry with intentionally provided low porosities, as compared to the surrounding masonry, will very rapidly become barrier layers with pores wholly clogged by means of carbon, as a result of the carbon carrier infiltration and the carbon deposition which occurs.

The barriers bounding the individual masonry areas may consist for instance of metal plates embedded into the masonry when making a new casing. Individual plates may be welded together or be sealed by means of refractory putties, pastes, or other types of mortar.

Also, the barrier may be a layer built up from a brushable refractory material containing a binder. Water glass, chemical binders and especially polymer binders are suitable binding agents, the refractory substance preferably being built up from materials based on silica or alumina, or other refractory oxides, including finely ground mullite, corundum, magnesite, zirconium oxide and spinel, individually or in mixtures. The foregoing may be used as coatings applied to the bounding plates so as to protect the plates from scaling.

A barrier layer may be also made by inserting cardboard steeped in water glass into the masonry, said cardboard being carburized in operation but nevertheless forming a sufficiently tight barrier layer. Plied papers or layers made from ceramic fibers with or without tar or waterglass impregnation, have also been found suitable, as are mere daubings of the brushable refractory materials, including glazing and ceramic coatings.

When relining a metallurgical vessel or a furnace, it will be very easy to install barrier layers useful in this invention, thereby dividing the masonry into individual areas to be infiltrated individually by means of the carbon carrier according to the masonry wear rate for any particular portion of the furnace. Preferably pre-finished components encased in a barrier layer on all sides except for the one exposed surface, may be used. Thus the masonry may be built up of individual square or rectangular pre-fabricated building components which, except for the required supply lines of the carbon carrier, will be provided with barrier layers on four or five sides. Joints between the barriers may be sealed by means of putties or mortar and if necessary by causing a carbon carrier to infiltrate the sealing materials, so as to make the joints sufficiently hermetic and permanently sealed. Obviously barriers may also be made up of construction components that are usually present, for instance steel beams used in furnace construction, so long as there will be no stresses introduced thereby. As regards relatively small vessels, for instance pony ladles in continuous casting facilities, which are normally provided with an outer cast steel casing, no outer barrier layer installation is required and the casing merely need be provided with inlet apertures and supply lines for introducing the carbon carrier at appropriate locations.

The rates of infiltration may vary from one type of masonry to another type of masonry and depending on use. Ordinarily the infiltration rate will be relatively high when starting operation with a newly lined masonry, gradually decreasing with increasing operation, due to increasing carbon deposition in the pores, joints and cavities of the refractory material.

Thus, in one installation the infiltration rate using a carbon dissociating gas which was 2-10 cubic meters/hr. per square meter of masonry surface, when starting operation, decreased to slightly below one cubic meter/hr. after about 100 hours (cubic meters at standard temp. and pressure). The amount of carbon deposited in the masonry depends on the amount of infiltrated carbon carrier. For very large amounts of infiltrates, for instance for values ten-fold the above, the carbon yield, that is the ratio of deposited carbon to carbon content of the carrier, will be less. For optimum yield therefore it is preferable to supply the carbon carrier at a lower rate. As regards gaseous carbon carriers, rates exceeding 10 standard cubic meters/hour/square meter, and for liquid carriers, rates exceeding 10 liter/hour m2, will ordinarily not be required, and these rates may be reduced to 50%-30% or even 10% of the above if operation time is increased, and down to zero in case of saturation is reached.

Depending on the severity of the attack on the masonry, the quantity of the infiltrating carbon carrier may be increased or decreased with respect to time or location. Especially threatened areas may be temporarily infiltrated at higher rates. On holidays or extended idle periods, the entire masonry may be infiltrated at only minute rates.

Controlling the extent of carbon deposition in the masonry can be achieved by monitoring the pressure in the supply lines, the pressure increasing with increasing carbon deposition and therefore with decreasing gas permeability. The pressure at the start of operation thus will ordinarily be less than 0.1 atm gauge and rapidly rise to higher values up to 1.0 atm gauge, from which values it may drop as masonry wear continues. Masonry wear may be countered by increased infiltration. Pressure monitoring also is recommended so as to avoid pressures high enough to cause fracture of the masonry. In individual cases, for instance in vacuum vessels, it may be necessary to discontinue infiltration during the below atmospheric pressure or vacuum phase or else to keep infiltration at a very low rate. In this way the danger of leakage of cracking gases used for infiltration is minimized.

The process of the invention is suited not only for infiltration during operation, but also may be used prior to operation. For example, a masonry free from carbon or with relatively little free or bound carbon may be heated prior to operation and be simultaneously infiltrated by a carbon carrier so as to fill the pores, joints and cavities of the masonry in continuous manner from the inside to the outside. This procedure is particularly advisable in starting operations with a cold installation where the masonry must be gradually heated prior to operation, in the usual way.

The process of the invention will be described in detail below with respect to the drawings accompanying this application, in which.

Figure 1:
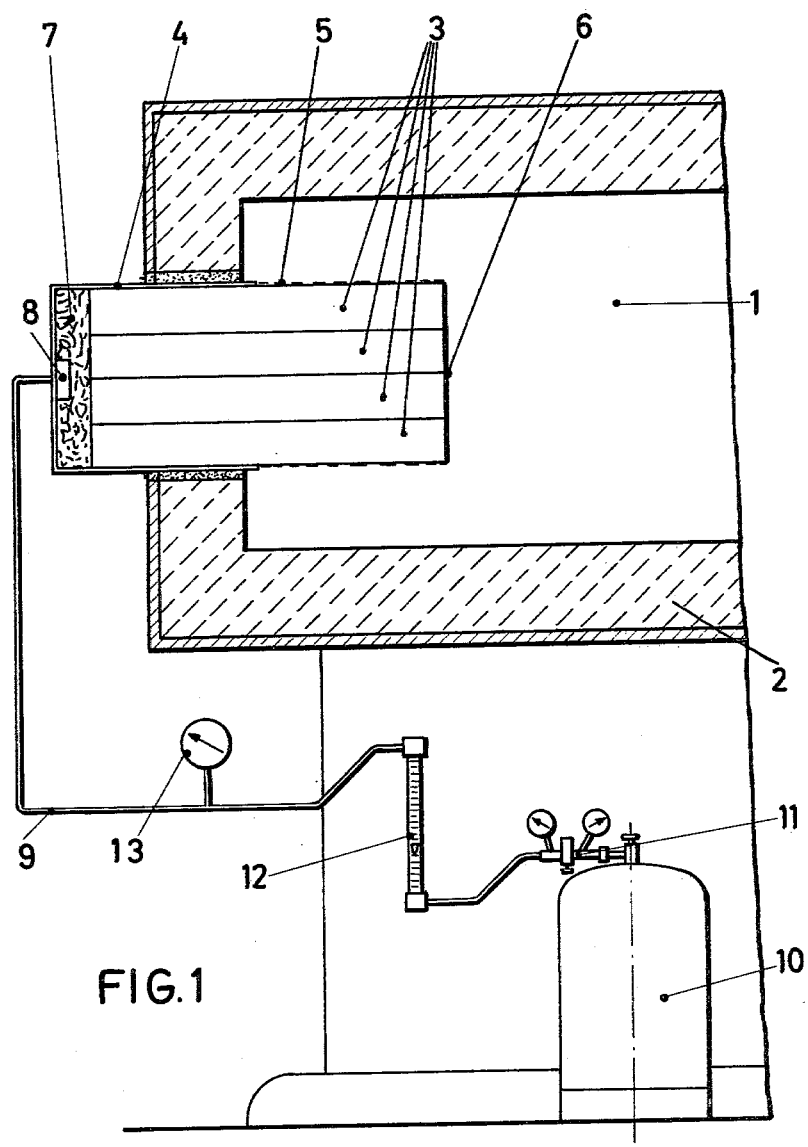
FIG. 1 is a view partly in section of experimental equipment for evaluating the extent of carbon deposition in the refractory masonry upon infiltration by the carbon carrier.

In the experimental equipment shown in FIG. 1, several test bricks 3 of magnesite material are shown extending into a furnace chamber 1 having a refractory lining 2, the rear ends of said bricks being located in an open end steel plate box 4; those parts of bricks 3 which project into furnace chamber 1 are coated with a barrier layer 5 made of a refractory putty. Only the front faces 6 of bricks 1 are not coated. The coated bricks simulate the conditions in a conventional metallurgical vessel. A fill consisting of a coarse-grained, refractory ceramic material 7 is located between the bottom wall of steel plate box 4 and the rear face of test bricks 3. A supply line 8 for the carbon carrier is embedded in the fill 7. The carbon carrier is supplied from a supply vessel 10 with a pressure reducing valve 11 through a flow meter 12 into a pipe 9 provided with a pressure indicator 13 and thence into plate box 4.

Using the apparatus of FIG. 1, and a furnace temperature of 1,500° C.; the temperature dropped to approximately 400° C. in the test bricks in the area of fill 7 at the start of infiltration. Following 50 hours of infiltration with propane as the carbon carrier the propane being supplied at a rate of 1 std. m3/hour, the initially carbon-free bricks held 10% carbon. With other infiltration rates, carbon contents of 3–8% were obtained in other tests in which the carbon yields were 30%–50% and fell to 5% for extremely high infiltration rates.

Figure 2:
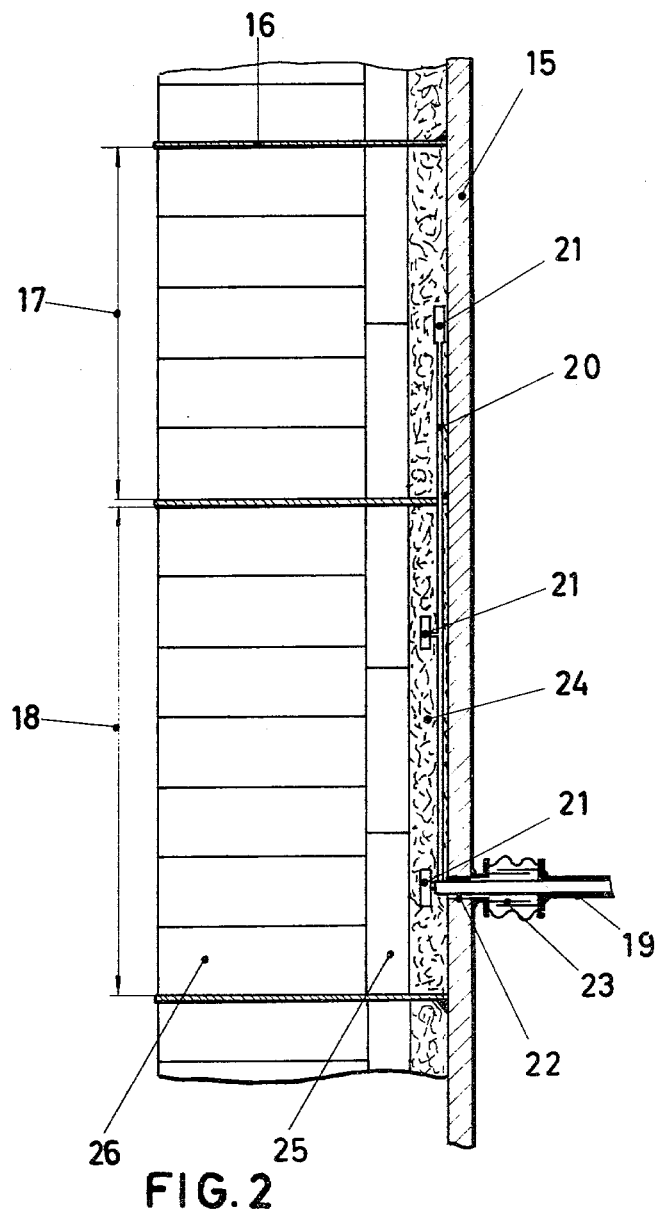
FIG. 2 is a fragmentary view in vertical cross-section through a portion of the masonry and the casing of a converter with a supply line for the carbon carrier.

One way in which the invention may be used is in a converter of the kind illustrated in FIG. 2. Such converter consists of a steel plate casing 15 with plates 16 that are welded at right angles to casing 15 or which may be loose. Plates 16 act as barrier layers, subdividing the masonry into individual infiltration areas 17,18. The carbon carrier is supplied to the masonry via distributor lines 21 which are connected to a common supply line 20 communicating with a main supply line 19 which passes through a borehole 22 and is movably supported in a sleeve 23. Distributors 21 are located in a porous distribution layer 24 connecting to a rear masonry 25 and then to magnesite brick masonry 26, the bricks of which may be low in iron content and steeped in tar and baked.

For a converter of the kind shown in FIG. 2, carbon enrichment exceeding 5% was obtained in bricks 26 and in the remaining rear masonry 25. Layered carbon deposits were found in the joints between the individual bricks 25,26, which were particularly effective in counteracting the anticipated premature wear of said joints.

In another converter of the type shown in FIG. 2, the masonry was provided with expansion joints in the form of inlays of ceramic webs of 1 mm thickness. At the subsequent breaking of the masonry, web residues of 0.2 mm. thickness were still present, which were wholly embedded with carbon and contained carbon to the extent of 80%.

Figure 3:
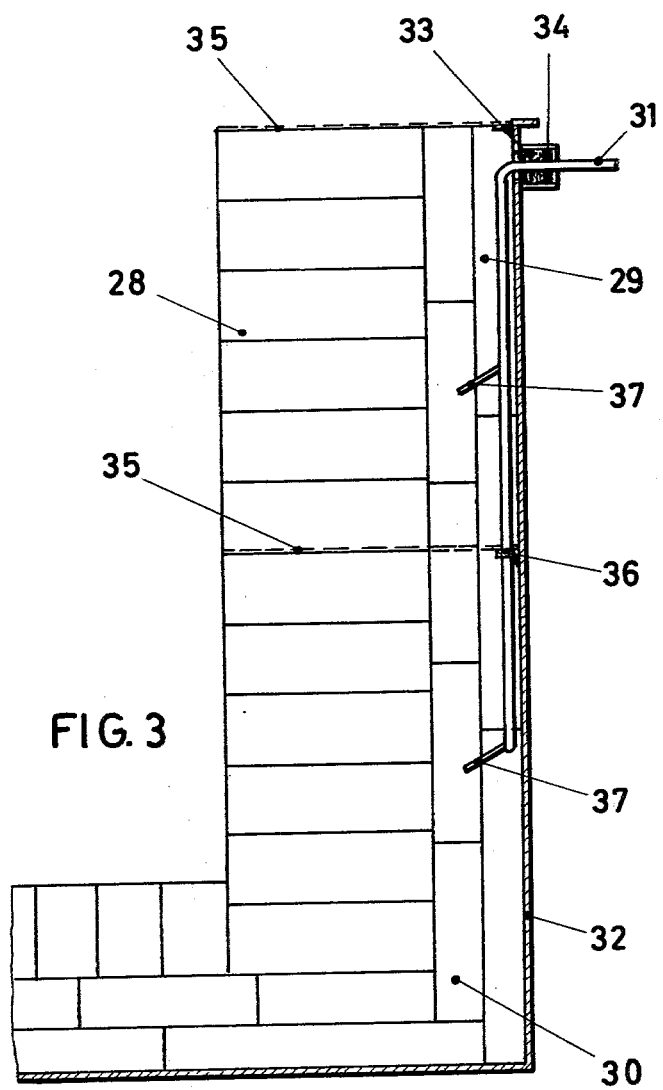
FIG. 3 is a similar view through another type of metallurgical vessel ordinarily provided with an insulating layer between the masonry and a steel casing.

The vessel shown in FIG. 3, represents a smaller vessel, for instance, a tundish of a continuous casting facility, the refractory lining consists of baked magnesite bricks 28 and a swollen mullite intermediate layer 30 between which is located an insulating layer 29 of bound asbestos fibers with a life up to 1,000° C. The carbon carrier is supplied through a line 31 which passes through a steel casing 32. A ceramic fiber 33 and putty 34 seal is located inside a bushing at the entry where line 31 enters the casing 32. Webbed inlays 35 subdivide the masonry into individual infiltration zones which are bounded to the rear by steel plate casing 32. Casing 32 is provided with small mounting brackets 36 to which the webbed inlays 35 are adhered by means of putty. In the embodiment of FIG. 3, the carbon carrier supplied by line 31 is introduced into intermediate layer 30 by means of individual pipe segments 37 which are slanted downward in order to avoid clogging of the pipes by penetration of impurities, especially from the erosion from the refractory bricks.

Figure 4:
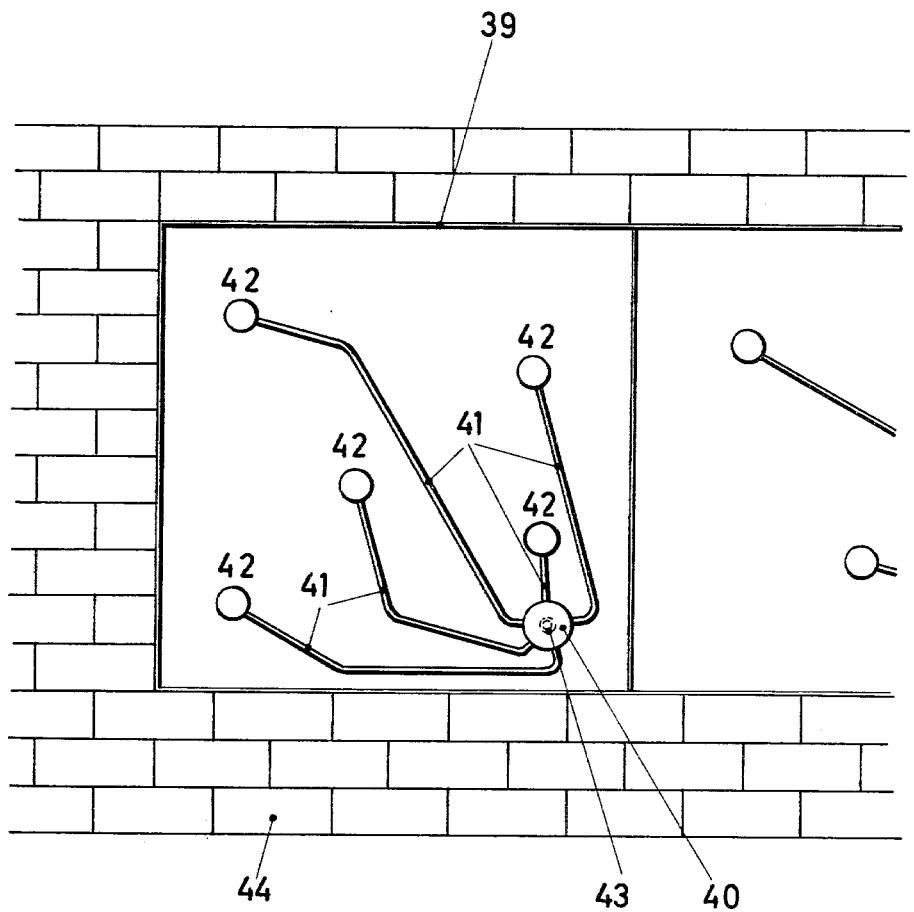
FIG. 4 is a plan view of the infiltration installation area of the masonry.

FIG. 4 shows the vessel from the outside. One or more masonry areas of about 2 m2 surface is located in a steel plate box 39 which opens towards the furnace inside. Individual supply lines 41 communicate from a distributor 40 to a total of five inlet locations 42, through which the fluid carbon carrier is delivered to the furnace masonry. The side-walls of steel plate box 39—which cannot be seen in FIG. 4—need not extend completely to the inside surface of the newly lined furnace masonry. The steel plate boxes 39 together with the masonry contained therein and a gas-permeable distributor layer of about 2 cm thickness on the floor of the box may be installed as finished subassemblies components into the ordinary masonry of a converter or other vessel, without there being any connection to the converter lining. Preferably the cross-sections of the inlet apertures will be the same as the cross-sections of supply lines 41, and up to twice these, in order to maintain the flow resistance at a low value and so as to prevent carbon increase at excessive temperature rises. The inlet positions may be provided with labyrinth-like components.

Figure 5:
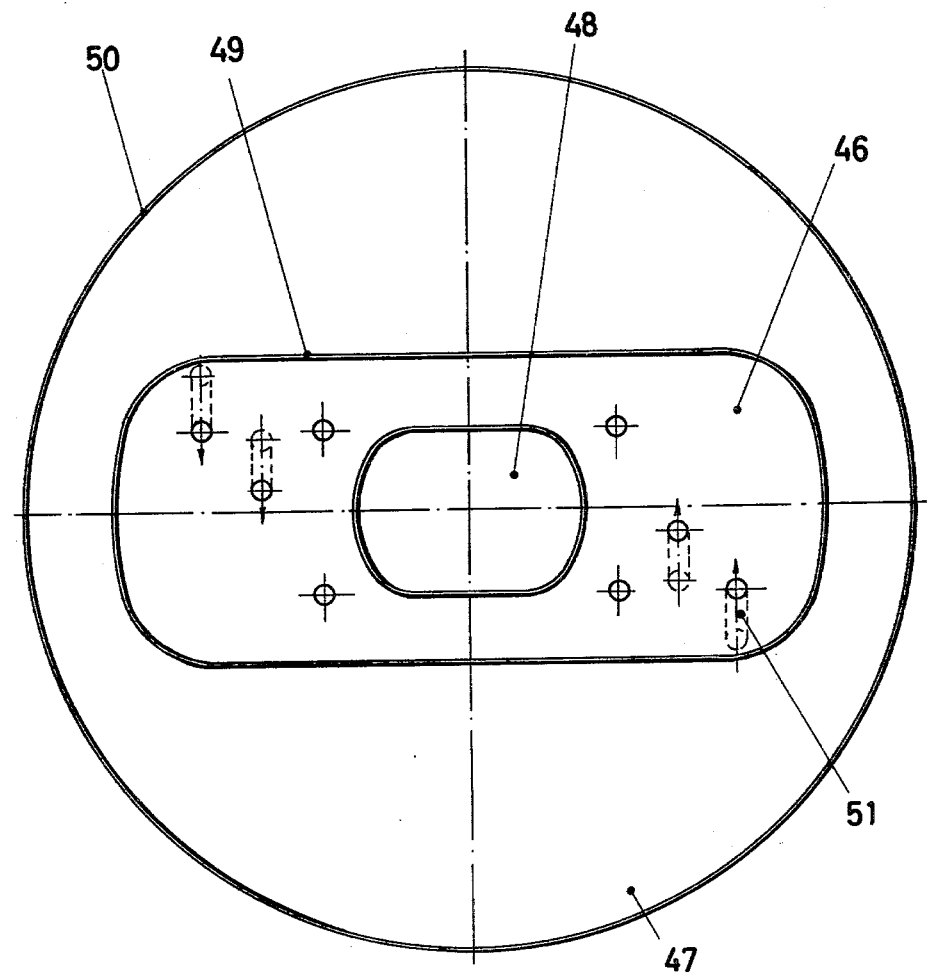
FIG. 5 is a top view of a converter bottom with an annular infiltration area.

FIG. 5 shows one kind of converter bottom for refining with pure oxygen eg as in U.S. Pat. No. 3,706,549. The converter bottom includes steel plate casing 50 which is subdivided into an infiltration area 46, an outer area 47 surrounding area 46 and a center area 48, this subdivision being effected by means of two barrier layers 49,49' consisting of ordinary steel plates. The individual barrier plates 49,49' are sealed with respect to the converter bottom plate 50 by means of a refractory putty. The bottom area 46 in which refining tuyeres 51 are mounted is the portion of the bottom subject to the most wear. This area 46 will be infiltrated by means of a carbon carrier in conformity with the process of the invention. The other bottom areas 47,48 may also be exposed to slight infiltration rates in order to keep the wear of the bottom to a minimum.

The process of the invention allows depositing carbon by means of infiltration in the pores, joints and cavities of any kind of a refractory masonry of any sort and thereby to counteract the natural decarburization caused by the furnace atmosphere, the slag and the metal. It has been found in practice that the life of conventional metallurgical vessels and furnaces was doubled and more. This especially applies to metallurgical vessels exposed to slag attacks at high temperatures, for instance to steel refining converters, or converters used in refining high grade steels and ferrous alloys, to electrical furnaces including induction furnaces and Siemens-Martin furnaces, and especially when such operate with pure oxygen, and also to ladles, tundishes, core-type furnaces, annealing furnaces, heating and pit furnaces.

What is claimed is:

1. A process for increasing the life of porous refractory oxide brick masonries subject to wear in furnaces and metallurgical vessels which comprises infiltrating a gaseous hydrocarbon capable to dissociating into carbon and other decomposition products, into pores in said brick masonries from an outer, relatively cooler surface area of said masonries toward an inner relatively hotter surface area of said masonries, said infiltration being effected while at least a portion of said brick masonries are at a temperature sufficient for said hydrocarbon gas to dissociate and to deposit carbon in said pores in brick masonries, thereby depositing carbon from said gas in said pores in situ, said hydrocarbon gas being supplied to said outer relatively cooler surface area at a rate not exceeding 10 standard cubic meters/hour/square meter of said relatively cooler surface area, said hydrocarbon gas being infiltrated into said brick masonries with a pressure gradient in a direction opposite that of the temperature gradient, which process includes providing at least one barrier layer which is hermetic with respect to gases in said masonry in order to confine the infiltration of gas to specific areas of the masonry.

2. A process as defined in claim 1, wherein the gas is made to infiltrate in a direction opposite that of masonry wear.

3. A process as defined in claim 1 wherein the gas is made to infiltrate into several areas of the masonry, each of said areas being bounded by a gas-tight barrier layer.

4. A process as defined in claim 1, characterized in that the barrier layer consists of a gas tight coating for said masonry.

5. A process as defined in claim 1, wherein the gas is infiltrated by means of supply and distribution channels extending into the masonry.

6. A process as defined in claim 1, wherein the gas is caused to infiltrate in pulses.

7. A process as defined in claim 1, wherein the infiltration is controlled as a function of pressure.

8. A process as defined in claim 1, wherein the masonry is heated prior to start of operations and simultaneously therewith said gas is infiltrated into said masonry.

9. A process as defined in claim 1, wherein the hydrocarbon gas is selected from the group consisting of methane, ethane, propane, butane, hexane, pentane, heptane, octane or their derivatives and combinations of said gases.

10. A process as defined in claim 1, wherein the masonry being infiltrated contains only a small amount of binding agents.

11. The process defined in claim 1 wherein said furnace or metallurgical vessel is provided with a gas-permeable distribution layer (24,30) between a steel plate outer casing (15,32,39) and the masonry to be protected (26,28), and with supply lines (19,20,31,37,41,42) terminating in the distrubution layer and said gas is supplied to said masonry by said supply lines.

12. The process as defined in claim 1, wherein said masonry (26,28,44,46,47,48) is subdivided into individual infiltration zones (17,18) by means of barrier layers (16,35,39), embedded in said masonry.

13. The process as defined in claim 1, wherein the masonry to be treated is confined at least in part in steel plate boxes (39) and supply lines (40,41,42) are operatively connected to said boxes.

14. The process as defined in claim 1, wherein said furnace or metallurgical vessel is a convertor of which the bottom is subdivided in at least two zones (46,47,48) by barrier layers (49,49',50), one zone (46) being provided with oxygen tuyeres (51), and supply lines are connected to said zone provided with oxygen tuyeres.

15. The process of claim 1 wherein said furnace or metallurgical vessel is provided with a gas-permeable distribution layer 30 within the masonry to be protected and with supply lines (31,37) terminating in the distribution layer and said gas is supplied to said masonry by said supply lines.

* * * * *